S. C. Schofield,

Shaft Coupling.

No. 4256. Reissued Feb. 7. 1871.

Witnesses:
J. W. Munday
H. F. Brown

Inventor:
S. C. Schofield
by Lewis E. Osborne
attorney

United States Patent Office.

SILAS C. SCHOFIELD, OF CHICAGO, ILLINOIS

Letters Patent No. 63,182, dated March 26, 1867; reissue No. 4,256, dated February 7, 1871.

IMPROVEMENT IN SHAFT-COUPLINGS.

The Schedule referred to in these Letters Patent and making part of the same.

*To all whom it may concern:*

Be it known that I, SILAS C. SCHOFIELD, of Chicago, in the county of Cook and State of Illinois, have invented a new and useful Improvement in Safety-Couplings for Tumbling-Shafts; and I do hereby declare and make known that the following is a full, clear, and exact description of the same, reference being had to the accompanying drawing and the letters and figures marked thereon which form part of this specification.

The object of my invention is to dispense with the connecting-pins which project through the ring in the ordinary coupling and are extremely liable to catch the clothes of persons passing near, and thus to wound, maim, or kill such persons by winding or revolving around the shaft and dashing them against neighboring timbers or other obstacles; and It consists in providing the forks of the coupling with lugs, gudgeons, or the equivalents, which enter suitable chambers or recesses in the interior face of the ring, as hereinafter more fully described, thus affording a sure and safe coupling, all danger, as aforesaid, being wholly avoided.

To enable those skilled in the art to construct and use my invention, I will proceed to describe the same with particularity, making reference in so doing to the aforesaid drawing, in which—

Figure 1:
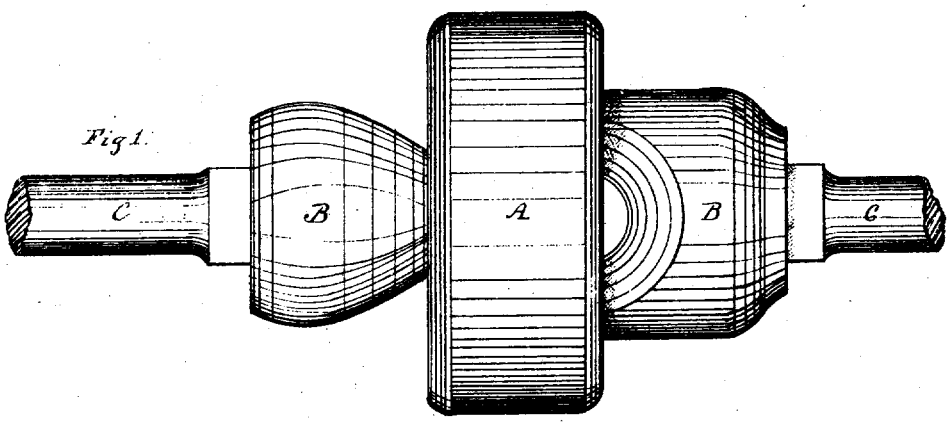
Figure 2:
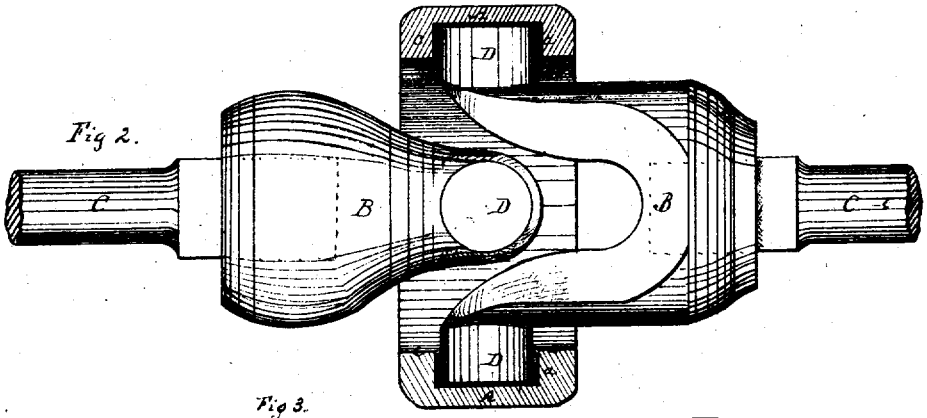
Figure 3:
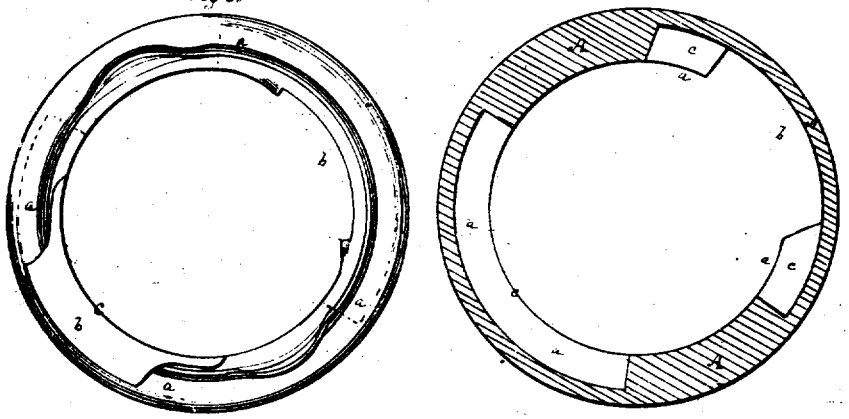

Figure 1 represents a side view of my invention;

Figure 2, a similar view, the ring being in section;

Figure 3, an end view of the said ring; and

Figure 4, a central section through the same.

Similar letters of reference in the several figures denote the same parts of my invention.

A represents the coupling-ring, and

B B, the forks or prongs of the coupling, into which the parts of the tumbling-rod enter, received in suitable sockets, as shown.

The prongs of the coupling are provided with gudgeons or pins D projecting laterally from said prongs, but are not long enough to pass through the ring, but rest in suitable chambers in the interior thereof, marked *a*, being indicated by dotted lines in fig. 3 and full lines in fig. 4.

These chambers are arranged opposite each other, and have each an opening in the flange or rim *c*, as shown at *b*, whereat the gudgeons D may enter into said chambers.

The said chambers extend each way from said openings, so that the fork introduced upon one side of the ring may be turned into the recess either side of the opening at which it was introduced to permit the other fork to enter on the other side in the same manner, and be turned in the opposite direction into the recess on the opposite side of said openings, so that the forks will stand at right angles with each other, as shown, while the gudgeons with which said forks are provided rest against opposite ends of the said chambers, the respective positions of said forks with regard to the chambers being changed according as the shaft is revolved in one direction or the other, thus forming a coupling for tumbling-rods of great flexibility with but little friction, and which at the same time possesses the merit of being perfectly safe from any of the accidents usually incident to couplings of the ordinary construction.

The forks of the coupling may be dispensed with by making the ring of sufficient width, so that the chambers in which the gudgeons lie may be wide enough to receive them side by side, in which case the chambers might be divided by a partition, making two chambers upon each side of the ring.

Having described the construction and operation of my invention, I will now specify what I claim, and desire to secure by Letters Patent.

I claim—

1. Providing the coupling-forks or heads B with gudgeons or their equivalents D, substantially as and for the purposes specified.

2. Constructing the ring A with two chambers, *a*, provided with lateral openings *b*, substantially in the manner and for the purposes set forth and shown.

3. The combination of the forks or heads B, provided with the gudgeons D, or their equivalents, with the chambered ring A, arranged and operating substantially as specified and for the purposes described.

4. In its application to a coupling for tumbling-shafts, the chambered ring, when made independent of the shaft-heads and constructed to inclose the same for the purpose of safety, substantially in the manner shown and described.

SILAS C. SCHOFIELD.

Witnesses:
J. W. MUNDAY,
H. F. BRUNS.